Feb. 13, 1973   D. M. FRASER   3,715,805
TREE PRUNING SAW
Filed June 1, 1970   2 Sheets-Sheet 1
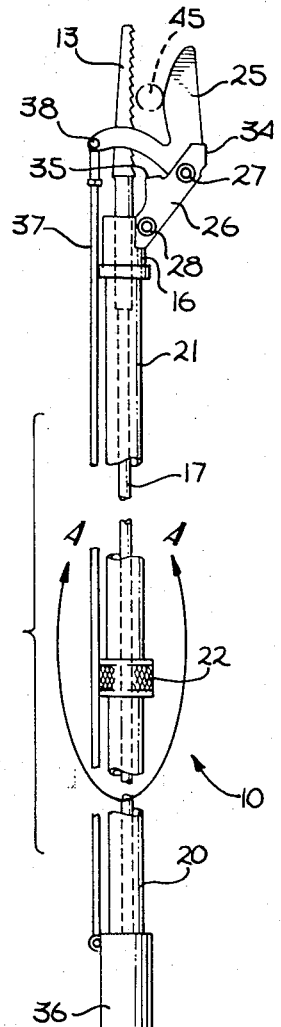
Fig. 1
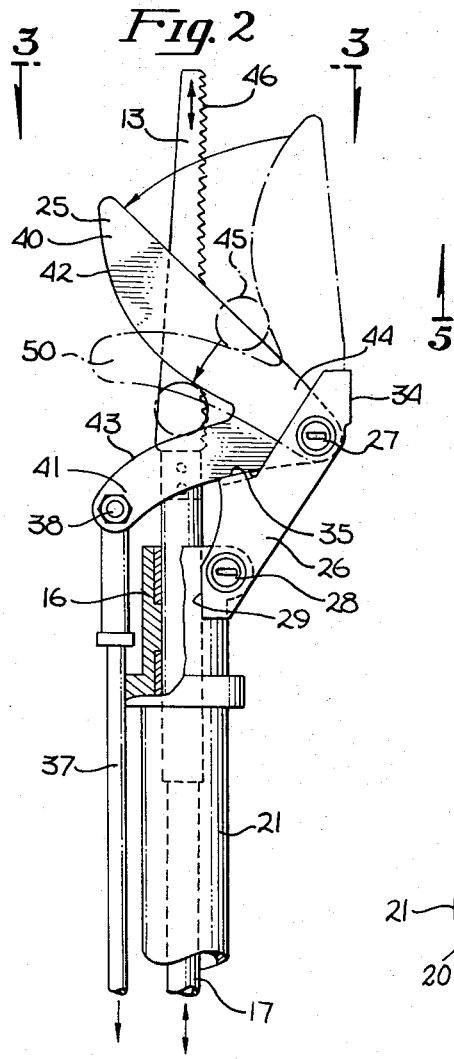
Fig. 2
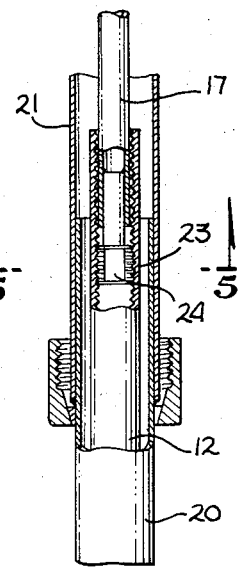
Fig. 4
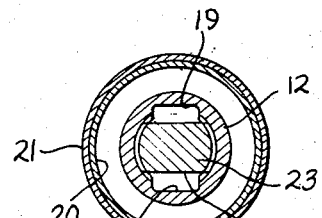
Fig. 5
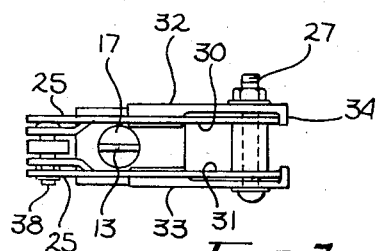
Fig. 3
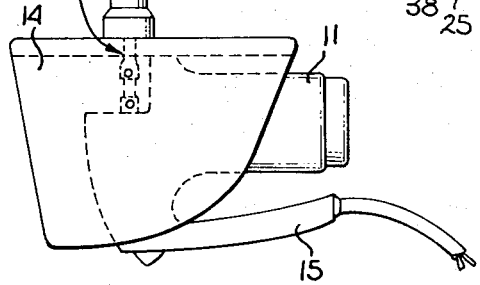
DONALD M. FRASER
INVENTOR.
BY Roger A. Marrs

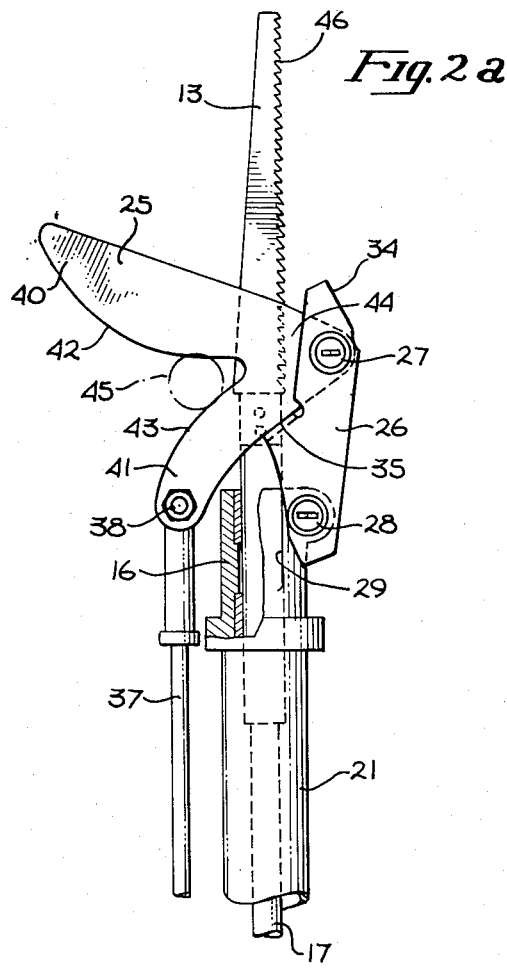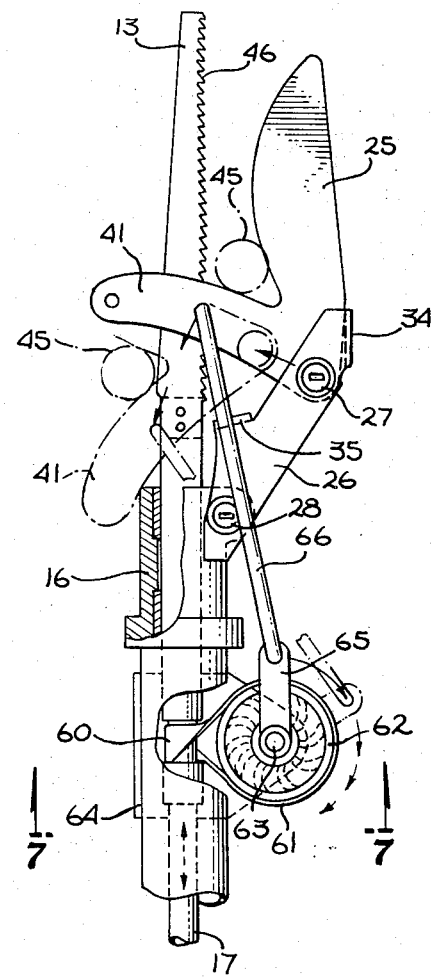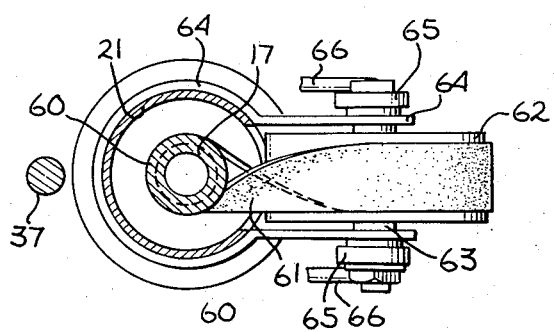

United States Patent Office 3,715,805
Patented Feb. 13, 1973

3,715,805
IMPROVEMENT IN A TREE PRUNING SAW
Donald M. Fraser, Los Angeles, Calif.
(4416 Lennox Ave., Sherman Oaks, Calif. 91403)
Filed June 1, 1970, Ser. No. 41,970
Int. Cl. B27b 11/10
U.S. Cl. 30—166                       8 Claims

ABSTRACT OF THE DISCLOSURE

An improvement in a tree or shrub branch pruning saw apparatus having a motor providing motive power for a reciprocating saw blade, and comprising a saw blade reciprocably carried on the end of a tubular pole opposite its other end at where the power source is carried, and a V-notched member pivotally mounted on a link which in turn is pivotally mounted to the end of the pole. Means such as an axially slidable handle, is provided along the pole's length and is pivotally connected to the V-notched member. Manual to-and-from (axial) motion provided the sliding handle pivots a selected branch held in the V-notched member through or across the path of the reciprocating saw blade. Stop means are provided for limiting the arc of movement of the V-notched member.

BACKGROUND OF THE INVENTION

(1) Field of the invention

This invention relates to tree and shrub pruning devices and, more particularly, to a novel means for supporting a selected branch to be cut and novel means for controllably introducing the branch to the cutting edge of a reciprocating saw.

(2) Description and problems of the prior art

In the past, a variety of motorized tree and shrub branch saws and cutting devices have been developed for separating branches smoothly so that there will be no jagged edges remaining on the tree or other limbs. In some instances, these prior art devices include means for supporting the limb during the cutting procedure. However, problems have been encountered when actual cutting takes place which are due to the presence of binding between the saw and the limbs or, binding or other interference with the supporting means for the limbs. In fact, some of the prior art devices which employ a straight-edged support for the limbs during the cutting action encounter a forced dislodgment of the branch from the support as the saw reciprocates during the cutting procedure. Also, no means are generally provided for determining the size of branch intended to be delivered to the cutting nip which is defined as that area or space adjacent the cutting edge of the blade and the supporting edge of the support. Obviously, larger diameter branches and limbs cannot be forced into a cutting nip which is designed to receive only branches or limbs of smaller diameters.

Other problems reside in providing means for preventing twisting of the blade or the support and for preventing buckling of the saw as well as guides and other operating means provided on the apparatus. Examples of conventional tree and shrub pruners are disclosed in U.S. Letters Pat. Nos. 3,340,612 and 3,181,239. In connection with these devices, it is to be noted that any device holding a limb must have the line of blade teeth parallel to the reciprocating shaft on which the blade is mounted; otherwise the saw teeth disengage from the limb and no sawing action takes place.

SUMMARY OF THE INVENTION

Accordingly, the problems and difficulties encountered with prior tree and shrub pruning devices are obviated by the present invention which provides a tubular pole having a cutting head carried on one end thereof which is operably connected to a reciprocating action power source carried on the opposite end of the pole. The cutting head includes a reciprocal saw blade with its line of teeth disposed parallel to its reciprocating mounting shaft. A V-notched member is provided in the area of the cutting head for receiving a selected branch or limb is caused to rotate about a pivot in an arc which is tangent to the saw blade and then to rotate about a different pivot to completely deliver the branch through the path of the reciprocating blade. The limb carried in the notch will be completely delivered to the cutting action of the saw. Manually operable means are provided for selectively actuating the support member so that control of the cutting action may be directed by the user.

Also, it is within the concept of the present invention to provide a power drive means which incorporates a power linkage for automatically oscillating the V-notched member and its brace members into and out of cutting relationship with the saw blade. The pruning device may be operated solely by automatic means or by manual means.

Therefore, it is among the primary objects of the present invention to provide a support for a selected limb and a delivery of the selected limb to the cutting edge of a reciprocally operable saw whereby twisting, binding and blockage of the limb is avoided.

Another object of the present invention is to provide a pivoting and translational movement for a V-notched support member holding a selected limb or branch whereby the cutting relationship with a reciprocating saw blade effects a complete delivery of the limb thereto.

Another object of the present invention is to provide manual or automatic reciprocation for a limb and which supporting element which is capable of being introduced to the cutting edge of a saw.

Yet another object of the invention is to provide a complete delivery of a selected limb which is progressively cut through without binding or twisting.

Still a further object resides in providing a novel V-notched member for supporting a limb and which is pivotally carried on a pivoted bracket so that the limb is introduced to the saw blade over an extended arc whereby the handle; i.e., achieves an advantageous mechanical advantage in the operation of the handle.

An object of the invention is to provide a rapid, efficient severing of a limb or branch by one operating my device.

Another object of the invention is to provide a locking grasp of a selected limb or branch for introduction and complete delivery thereof to the cutting action of the blade.

A further object of this invention is to provide a cutting action progressively along the length of the blade to achieve a faster cutting action and longer blade life.

A still further object of the invention is to provide a selectivity of cutting action upon the support or V-notched member by a secondary means axially slidable on the pole.

A further object of the invention is to provide a convenient handling support by such secondary means in the operation of the device.

These and other objects and advantages will become fully apparent upon a reading of the following description, the appended claims thereto, and the accompanying drawing.

BRIEF DESCRIPTION OF THE DRAWING

FIG. 1 is a side elevational view of the novel tree pruning device incorporating the present invention.

FIG. 2 is an enlarged elevational view of the branch retaining and cutting head employed in the device of FIG. 1.

FIG. 2a is an enlarged side elevational view similar to FIG. 2, however, with the branch retaining head in its extreme actuated position.

FIG. 3 is an enlarged end view of the tree pruning device as taken in the direction of arrows 3—3 of FIG. 2.

FIG. 4 is a longitudinal cross-sectional view of the extendable coupling for joining opposing sections together forming the pole of the device.

FIG. 5 is a transverse cross-sectional view of the extendable coupling shown in FIG. 4 as taken in the direction of arrows 5—5 thereof.

FIG. 6 is a side elevational view of another embodiment of the present invention incorporating a power linkage for oscillating the notched support member.

FIG. 7 is a sectional view taken on line 7—7 of FIG. 6.

DESCRIPTION OF THE PREFERRED EMBODIMENTS

Referring to FIG. 1, the novel tree and shrub limb or branch pruning apparatus of the present invention is illustrated in the general direction of arrow 10 and includes a power source 11 such as an electric motor, operably affixed to one end of an elongated tubular pole 12. A saw blade 13 is suitably secured at its other end and is preferably mounted on an extension such as an elongated operating rod 17 having its upper end attached to the blade 13 and its lower portion axially disposed within the tubular pole 12 (FIG. 4) whereby the saw blade 13 is actuable in a reciprocal cutting fashion or action. A housing 14 housing 14 encloses and mounts the power source 11 and further serves to mount a hand grip 15 thereon. The motor housing may include a trigger mechanism for permitting the motor to be turned ON and OFF by the operator. It is to be understood that the power source 11 is suitably coupled by power transmission means to reciprocate the operating rod 17 via the pole 12.

Mounted about the pole 12 is a tubular member comprising a lower section 20 and an upper section 21. Their adjacent ends are joined together in a telescopic relationship, and are provided a rotary joint member 22 (FIGS. 1, 4, 5) for tightening thereabouts to effect a rigid extension. When loosened, the tube 21 may axially slide about tube 20 to shorten or increase the overall length of the device. As this telescoping action occurs, a corresponding action or movement for elements 12 and 17 are necessary. Preferably, to do this thread segments are provided on a flat-sided stud 23 carried on the lower end of the rod 17. These segments normally engage with internal thread segments of the operating pole 12. When either the rod 17 or pole 12 is rotated 90° relative to each other, these thread segments are disengaged from each other. Such disengagement is provided by including opposing channels or keyways 19 ad 19' formed 180° apart in the lower portion of pole 12. In operation, such keyways 19 and 19' accommodate the thread segments of the stud 23 during the telescoping action between rod 17 and pole 12.

In general, FIG. 1 further shows that adjacent to the end of the pole 12 opposite from its end carrying the motor 11 a V-notched limb support member 25 is provided and which is carried on a brace or link 26 by means of a pivot 27. The brace 26 is secured to a housing or collar 16 mounted on the end of the tubular section 21, by means of a pivot connection 28. The limb support member 25 includes a pair of spaced-apart, V-notched pieces 30 and 31, as seen in FIG. 3, which are separated by the blade 13 and which pivotally move relative to identical pieces 32 and 33 constituting the brace 26. Each piece 32, 33 of the brace 26 includes an actuator 34 at its one end for providing movement of brace 26 about its pivot 28 by means of the clockwise movement of support member 25. Each piece 32, 33 of brace 26 further includes a stop 35 formed intermediate their ends for limiting movement of the member 25 in a counterclockwise direction. Upon contact of membeer 25 with stops 35, the latter function as an actuator for pivoting the brace 26 about its pivot 28. The brace 26 is limited in its pivotal travel in both directions by a stop 29 formed on the housing or collar 16. In a clockwise direction, member 25 strikes actuator 34 and upon further clockwise movement of member 25, the brace 26 strikes in successive turn the stop 29.

A sleeve or handle 36 mounted about the lower section 20 is provided to manually pivot the limb support member 25 and the brace 26.

The upper end of the handle 36 is coupled to a connecting rod 37 which, in turn, is pivotally connected to member 25 by a pivot 38. Therefore, by moving of the handle 26 upwardly or away from the power source 11, the member 25 will be pivoted to the position shown in phantom lines in FIG. 2. However, when the handle 36 is moved in the direction of the power source 11, the support member 25 will assume the position shown in solid lines of FIG. 2. FIG. 2a shows the final limb cutting position in which the brace 26 is pivoted about connection 28 so that member 25 is drawn through the path of the blade whereby the bottom of the V-notch moves past the cutting teeth of the blade.

Referring now to FIG. 2, it can be seen that the limb or branch support member 25 includes a pair of outwardly extending segments 40 and 41 which include opposing edges 42 and 43 that diverge to merge together at a central body portion 44. The edges 42 and 43 provide a V-shaped notch into which a suitable branch or limb, as noted by numeral 45, may be placed. The cutting edge 46 of the saw 13 faces the apex of the notch so that as the support member 25 is rotated counterclockwise, the branch will be introduced to the cutting edge 46 and cutting of the branch or limb will continue as long as rotation proceeds.

With member 25 in position as shown by FIG. 1 the distance between saw blade teeth and member 25 determines the maximum size branch that can be cut.

In the operation of deivce 10, the limb support member 25 is rotated clockwise by moving handle 36 until its movement is arrested by engagement with actuator 34 and the brace 26 engages the stop 29 on collar 16. At this time, the largest opening is defined between saw edge 46 and edge 52 through which the selected branch or limb may be positioned so as to be seated in the notch as close to its apex as possible between opposing edges 42 and 43. Once this position has been achieved, the motor may be activated so that the saw blade 13 will reciprocate. Handle 36 and hence rod 37 may be pulled downwardly so as to rotate the V-limb support member in a counterclockwise direction. The limb 45 is delivered into the path of the saw blade 13 (FIG. 2), thereby initiating the cutting action of the blade. As the counterclockwise rotation and cutting action is continued, the V-notched member 25 engages stop 35 on the brace 26. In the event a larger-sized branch is being cut, it will have been completely severed in this position of member 25 and as shown in FIG. 2. Smaller sized branches will be merely partially severed. With a smaller sized branch, further movement of member 25 and brace 26 in unison therewith continues about pivot 28, as a result of actuator 35 engaging member 25.

Pressure for pressing the limb or branch against the blade is achieved through the manual control of the handle 36 via rod 37. Should binding or twisting of the blade with the branch be encountered by the user, clockwise rotation may be affected by movement of the sleeve and rod so that the pressure is relieved from the cut. Also, it is to be borne in mind that the saw 13 is disposed between support member pieces 30 and 31 as shown in FIG. 3. Therefore, improved control of the limb during the cut is experienced since the pieces 30 and 31 form a yoke between which the reciprocating saw 13 is disposed when forcibly engaged with the limb.

Referring now in detail to FIGS. 6 and 7, another embodiment of the present invention is shown, and which provides a power linkage from the motor to the support member via the reciprocating action of operating rod 17. Operating rod 17 includes a fixture 60 secured thereto and about which a turn of a pulley belt is frictionally disposed. The pulley belt is indicated by numeral 61 and includes an upper loop which is disposed about a conventional clutch unit 62 such as a sprag clutch unit commercially available from the Form Sprag Company, Warren, Mich. The clutch unit 62 is rotatably carried on shaft 63 which is supported by a bracket yoke 64 fixedly carried on the tubing 21. The shaft 63 is coupled to segment 41 of the member 25 via power drive links 65 and 66. The opposite ends of rod 66 which are connected to the links 65 and segment 41 are provided with pivoting connections.

Therefore, it can be seen that a back-and-forth, oscillatory motion is achieved which is directly driven by the reciprocating movement of operating rod 17. As the rod moves back and forth, the rubber drive belt 61 will move first in one direction and then in the opposite direction and in so doing, oscillates clutch 62 in a similar curvilinear back-and-forth motion. This motion is translated via the shaft 63 into a rotary motion of the power links 65. Rods 66 consequently introduce oscillatory rotation to member 25. The amount of rotation of clutch 62 is limited to a relatively small number of degrees determined by the rod 17 travel, generally less than ten degrees, so that sufficient pivotal motion is given to the member 25 for feeding the limb or branch to the cutting edge of the blade. The main control for feeding the branch to the cutting edge resides with the manual operation of sleeve 36 and rod 37. Such a provision for the power drive attachment provides greater flexibility in confined areas, relieves fatigue during extending operation, and allows limbs to be cut at a greater distance from the operator.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

Therefore, what I claim as patentably novel is:

1. In a pruning device for cutting tree or shrub limbs, the combination comprising:
   a pole,
   a power source carried on its one end and a saw including a cutting edge carried on its other end,
   means movably carried on said pole and operably interconnecting said power source and said saw for reciprocating said saw,
   a support member pivotally carried on said other end of said pole and formed with a notch having a central opening adapted to receive the limb,
   said notch being defined by outwardly diverging edges and wherein said opening faces the cutting edge of said saw,
   actuating means operably carried on said pole and pivotally connected to said support member for pivoting it toward and away from said saw, and
   means operably interconnecting said actuating means with said saw.

2. The invention as defined in claim 1 including a mechanical linkage pivotally coupled between said support member and a movement translation means whereby back-and forth movement of said reciprocating means is transferred to back and forth movement of said support member about its pivot.

3. The invention as defined in claim 1 including a support bracket pivotally connected at one end to said other pole end and angularly projecting outwardly with respect to the longitudinal axis of said pole and including a pivot connection on its free end to pivotally mount said support member.

4. The invention as defined in claim 2 including a bracket connecting said support member to said pole, and stop means carried on the opposite ends of said bracket for restricting clockwise and counterclockwise rotation of said support member and said bracket.

5. The invention as defined in claim 1 including a mechanical motion transferring linkage operably coupled between said reciprocating means and said support member for automatically pivoting said support member back and forth about its pivot in response to reciprocating movement of said reciprocating means.

6. The invention as defined in claim 1 including a bracket pivotally connected at one end to said other pole end and pivotally connected to said support member whereby said member is moved toward and away from said saw in response to said actuating means; and
   stop means for limiting the movement of said member and said bracket.

7. In a pruning device including a reciprocating power source and a cutting saw on opposite ends of a pole, a tubular housing circumscribing the pole and having a means for supporting a branch or the like mounted thereon, and means for actuating said supporting means, the improvement comprising:
   a brace member pivotally connected at its one end to the tubular housing adjacent the cutting saw,
   said supporting means being pivotally mounted to said brace member at its other end,
   whereby arcuate motions are provided for said supporting means and brace member,
   said actuating means being pivotally connected to said supporting means to cause it to pivot about said brace member, and
   stop means for controlling the extent of the arcuate motions of said supporting means and brace member.

8. In the device of claim 7, said actuating means being comprised of a sleeve axially slidably about the tubular housing and being pivotally connected to said supporting means by a rod.

References Cited

UNITED STATES PATENTS

| | | | |
|---|---|---|---|
| 1,224,194 | 5/1917 | Miller | 30—166 |
| 2,751,940 | 6/1956 | Miller | 30—166 X |
| 3,181,239 | 5/1965 | Skok | 30—166 |
| 3,340,612 | 9/1967 | Knight | 30—166 |

ROBERT C. RIORDON, Primary Examiner

J. C. PETERS, Assistant Examiner